United States Patent [19]

Steiner et al.

[11] Patent Number: 4,576,488
[45] Date of Patent: Mar. 18, 1986

[54] BEARING BUSHING

[75] Inventors: Helmut Steiner; Wilfried Ebbinghaus, both of Wiehl; Hartmut Paech, Waldbröl, all of Fed. Rep. of Germany

[73] Assignee: Bergische Achsenfabrik Fr. Kotz & Söhne, Wiehl, Fed. Rep. of Germany

[21] Appl. No.: 707,094

[22] Filed: Mar. 1, 1985

[30] Foreign Application Priority Data

Mar. 2, 1984 [DE] Fed. Rep. of Germany .... 3407678

[51] Int. Cl.⁴ .............................................. F16C 33/10
[52] U.S. Cl. .................................... 384/291; 384/286; 384/322
[58] Field of Search .......................... 384/276, 286–293, 384/316, 322, 378, 100

[56] References Cited

U.S. PATENT DOCUMENTS 2,249,843  7/1941  Marsland ............... 384/292
4,459,048  7/1984  Stachuletz ............. 384/291
4,474,483  10/1984 Suzuki et al. ................ 384/316 X Primary Examiner—Stuart S. Levy
Assistant Examiner—Thomas R. Hannon
Attorney, Agent, or Firm—Becker & Becker, Inc.

[57] ABSTRACT

A bearing bushing for a journal bearing of a brake shaft of a drum brake. One end of the bearing bushing, on the outside, is provided with a circumferential, annular grease recess for the introduction of grease. Branching off in the axial direction from this recess are distributing channels, and disposed as extensions thereof on the inside are lubricating channels which extend in the opposite axial direction. In order to improve the distribution of grease, and to improve the formation of a closed lubricating film, each distributing channel opens out into a hole, which are interconnected on the inside by a circumferential, first annular channel. The inner lubricating channels are disposed between the distributing channels, extend parallel thereto between the holes, and are connected to the first annular channel. The lubricating channels open out into a circumferential second annular channel, which is connected to at least one outlet channel.

8 Claims, 6 Drawing Figures

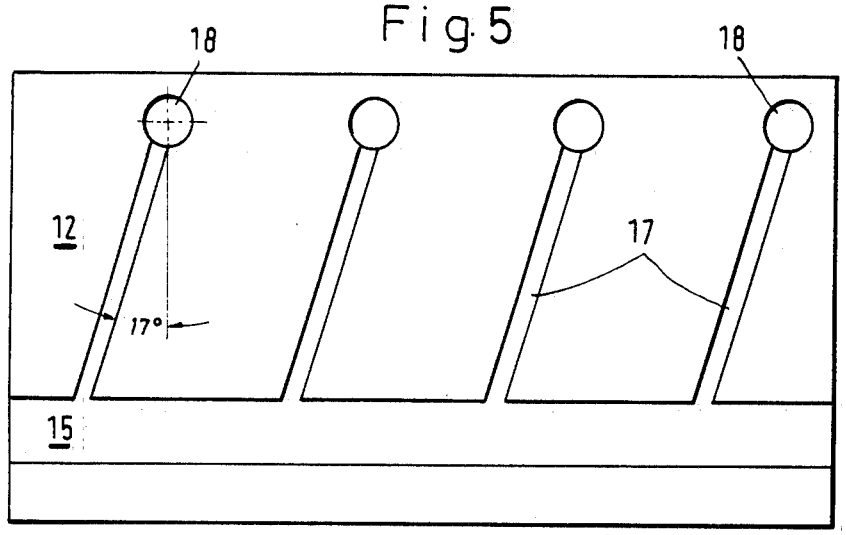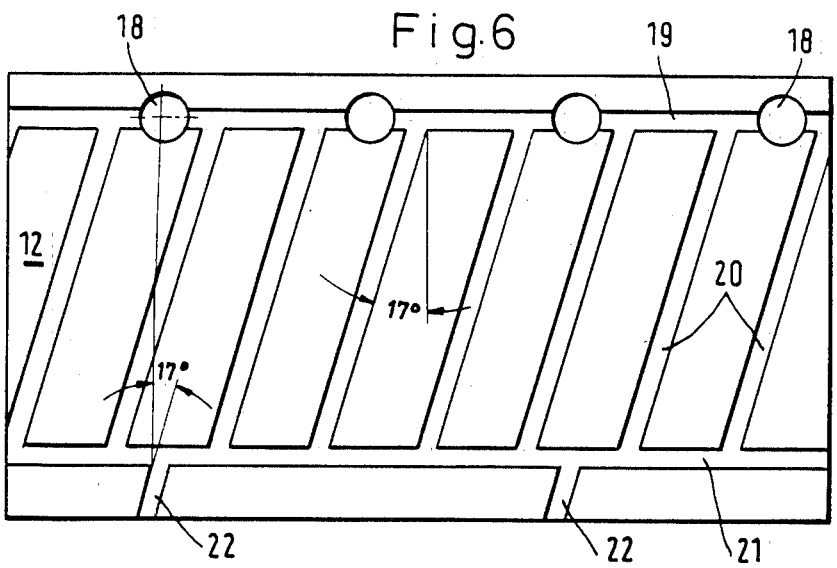

BEARING BUSHING

BACKGROUND OF THE INVENTION

The present invention relates to a bearing bushing for a journal bearing of a brake shaft of a drum brake; at one end, the bearing bushing is provided on the outside with a circumferential, annular grease recess for the introduction of grease; distributing channels branch off in the axial direction from this grease recess, and open into a hole; lubricating channels which extend in the opposite axial direction are disposed on the inside of the bearing bushing.

With one heretofore known bearing bushing which has already been used for the same application, the distributing channels which proceed from the grease recess are connected directly via holes with the lubricating channels which extend on the inside in the opposite direction, and which at the end of the bearing bushing open out and therefore have a free discharge. With this heretofore known bearing bushing, the grease distribution, and in conjunction therewith the formation of the lubricating film, are inadequate. This is primarily true because the lubricating channels discharge freely, and therefore no grease build-up can be produced when the intercommunicating system of the distributing and lubricating channels are filled. Furthermore, these heretofore known bearing bushings have the drawback that, because of their use in drum brakes of road vehicles, moisture, especially in the form of salt spray, can enter from the outside and promote corrosion.

It is an object of the present invention to provide a bearing bushing of simple construction which effects an improved distribution of grease, and which makes possible the formation of a closed lubricating film which is sealed relative to the penetration of moisture.

BRIEF DESCRIPTION OF THE DRAWINGS

This object, and other objects and advantages of the present invention, will appear more clearly from the following specification in conjunction with the drawings which show one preferred embodiment, and in which:

FIG. 5 shows a modified bearing bushing from the outside; and

FIG. 6 shows a modified bearing bushing from the inside.

SUMMARY OF THE INVENTION

Figure 1:
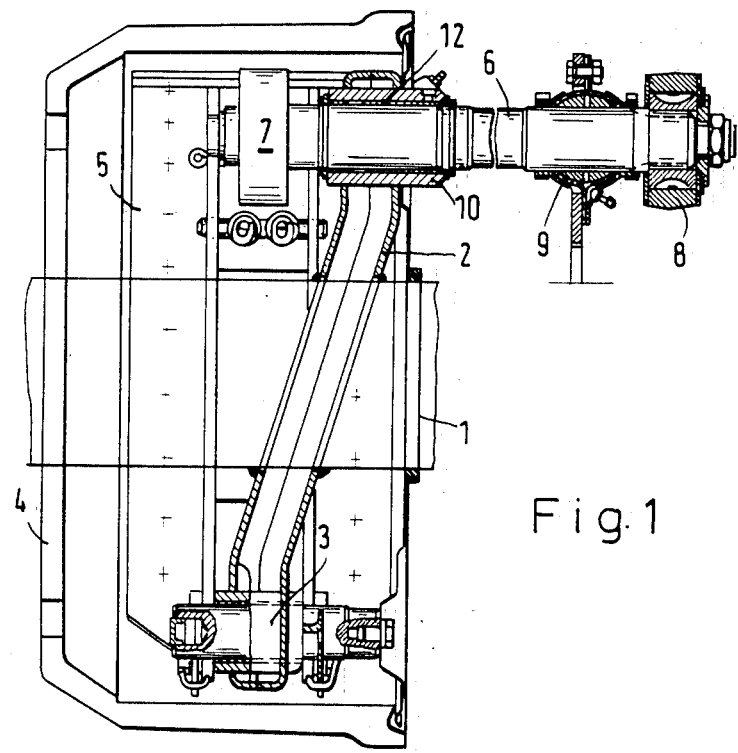
FIG. 1 is a longitudinal section through a drum brake having disposed in a brake bridge a journal bearing for the brake shaft.
Figure 2:
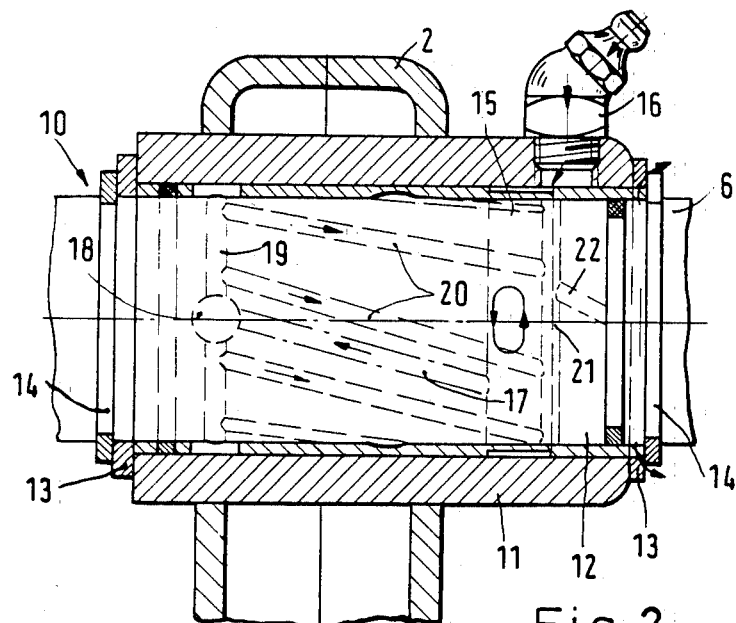
FIG. 2 is an enlarged view of the journal bearing illustrated in FIG. 1, and shows the position of a bearing bushing.
Figure 3:
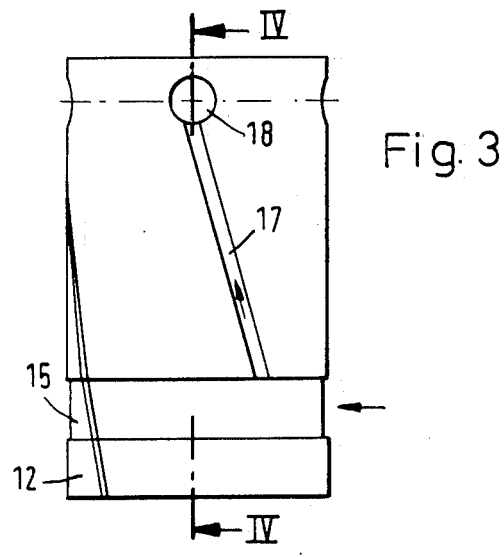
FIG. 3 is a view of a bearing bushing from the outside.
Figure 4:
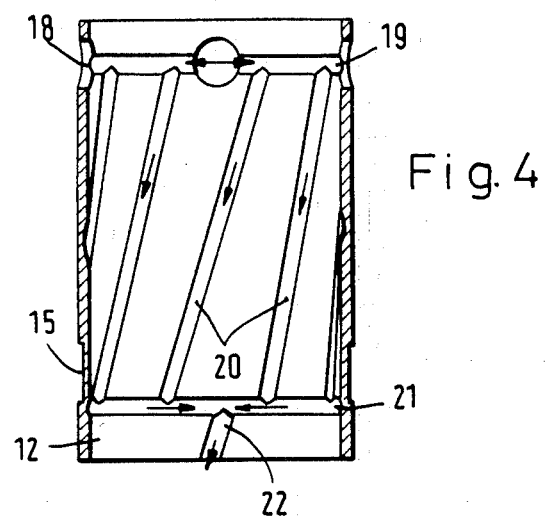
FIG. 4 is a sectional view of the bearing bushing of FIG. 3 taken along the line IV—IV thereof.

The bearing bushing of the present invention is characterized primarily in that a circumferential, first annular channel interconnects all of the holes on the inside of the bearing bushing; in that the inner lubricating channels are disposed between the distributing channels and parallel thereto between the holes, and are connected to the first annular channel; in that the lubricating channels open out into a circumferential second annular channel, and in that at least one outlet channel is connected to the second annular channel.

A bearing bushing constructed pursuant to the teaching of the present invention has the advantage of a considerably improved grease distribution, and already with the first grease filling makes possible the formation of a closed lubricating film, because the grease in the communicating system is distributed better to the lubricating channels by the first inner annular channel, and because as the grease discharges via the second annular channel, a build-up or accumulation is formed which forces the grease into the surfaces disposed between the lubricating channels. This build-up during grease filling occurs because the cross-sectional area of the outlet channel or channels is considerably less than the cross-sectional area of the distributing and lubricating channels.

A further advantage of the proposed inventive construction consists in that after the introduction of the grease filling, the two annular channels which are adjacent to the ends of the bearing bushing on the inside have the effect of annular sealing elements which prevent moisture from entering the region of the lubricating film.

Pursuant to one practical embodiment of the present invention, the distributing channels and the lubricating channels are expediently disposed in such a way that they extend at an acute angle of preferably 17° to the axial direction in order to increase their overall length and hence that surface of the brake shaft which is wetted with the grease. The distance between successive lubricating channels is expediently selected in such a way that it corresponds approximately to the travel of the brake shaft, so that a closed lubricating film is constantly maintained.

Pursuant to further advantageous specific features of the present invention, the second annular channel can be disposed between the grease recess and the outer edge of the bearing bushing. The number of lubricating channels is expediently greater than, and preferably twice as great as, the number of distributing channels. The number of outlet channels is expediently less than the number of lubricating channels.

DESCRIPTION OF PREFERRED EMBODIMENTS

Referring now to the drawings in detail, a brake bridge 2 is mounted on an axle member 1. Disposed in the brake bridge 2, at the lower end, is a support mounting 3 for brake shoes 5 which cooperate with a brake drum 4 and can be spread apart by a brake cam 7 via a brake shaft 6. The brake shaft 6 is actuated by a brake lever 8, and is mounted not only in a support bearing 9 which is connected with the axle member 1, but also in a journal bearing 10 which is mounted in the brake bridge 2.

The journal bearing 10 comprises an outer bearing sleeve 11, which is mounted in the brake bridge 2, and a bearing bushing 12, which is pressed into place in said bearing sleeve 11, and is made of brass, bronze, or a sintered metal which is suitable as a bearing material. The bearing bushing 12 is fixed in position by means of spacers 13 and spring or snap rings 14.

A circumferential, annular grease or lubricant recess 15 is provided on the outside of the bearing bushing at one end thereof; the grease recess 15 is disposed partially under a grease fitting 16 provided in the bearing sleeve 11. A plurality of, in the illustrated embodiment 4, distributing channels 17 proceed from the grease recess 15 and open out at the other end of the bearing bushing 12 into holes 18. On the inner side of the bearing bushing 12, all of the holes 18 are interconnected by a circumferential, first annular channel 19. A plurality of, in the illustrated embodiment 8, lubricating channels 20 proceed from the first annular channel 19, and at the other end of the bearing bushing 12 are connected to a circumferential, second annular channel 21. A plurality of, in the illustrated embodiment 2, outlet or discharge channels 22 are connected to the second annular channel 21.

The distributing channels 17 and the lubricating channels 20 extend parallel to one another, and are inclined at an angle of approximately 17° to the axial direction. Two lubricating channels 20 are disposed between each two distributing channels 17, so that there are twice as many lubricating channels 20 as there are distributing channels 17.

The grease is forced in through the grease fitting 16, whereupon it is distributed via the grease recess 15, the distributing channels 17, the holes 18, and the first annular channel 19 into the lubricating channels 20. The excess grease can escape via the second annular channel 21 and the two outlet channels 22. Escaping grease is an indication that the lubricating channels 20 are filled.

The present invention is, of course, in no way restricted to the specific disclosure of the specification and drawings, but also encompasses any modifications within the scope of the appended claims.

What we claim is:

1. A bearing bushing for a journal bearing of a brake shaft of a drum brake, said bearing bushing having an inside and an outside, and two ends; the bearing bushing further comprises:
   a circumferential, annular grease recess disposed in the outside of said bearing bushing at one end thereof for receiving grease;
   distributing channels disposed in the outside of said bearing bushing and extending essentially in the axial direction thereof; each of said distributing channels communicates with said grease recess and extends toward the other end of said bearing bushing;
   respective holes in said bearing bushing; each of said holes communicates with one of said distributing channels, and is disposed at that end thereof remote from said grease recess;
   a circumferential, first annular channel disposed in the inside of said bearing bushing at that end thereof remote from said grease recess; said first annular channel interconnects all of said holes;
   lubricating channels disposed in the inside of said bearing bushing and extending parallel to, and between, said distributing channels; said lubricating channels communicate with said first annular channel between said holes;
   a circumferential, second annular channel disposed in the inside of said bearing bushing at that end thereof remote from said holes and said first annular channel, at that end where said grease recess is provided; said lubricating channels also communicate with said second annular channel; and
   at least one outlet channel provided in said bearing bushing and communicating with said second annular channel.

2. A bearing bushing according to claim 1, in which said distributing channels and said lubricating channels extend at an acute angle to the axial direction of said bearing bushing.

3. A bearing bushing according to claim 2, in which said distributing channels and said lubricating channels extend at an angle of approximately 17° to the axial direction of said bearing bushing.

4. A bearing bushing according to claim 2, in which the distance between successive ones of said lubricating channels, when measured in the axial direction of said bearing bushing, corresponds approximately to the travel of which said brake shaft is capable.

5. A bearing bushing according to claim 2, in which said second annular channel is disposed between said grease recess and the outer edge of that end of said bearing bushing which is remote from said first annular channel.

6. A bearing bushing according to claim 2, in which the number of lubricating channels is greater than the number of distributing channels.

7. A bearing bushing according to claim 6, in which there are twice as many lubricating channels as there are distributing channels.

8. A bearing bushing according to claim 6, in which the number of outlet channels is less than the number of lubricating channels.

* * * * *